Patented Dec. 9, 1941

2,265,140

UNITED STATES PATENT OFFICE 2,265,140

VAT DYESTUFF OF THE DIBENZANTHRONE SERIES AND PROCESS OF PRODUCING SAME

Walter Bruck, Mannheim, Germany, assignor to General Aniline & Film Corporation, a corporation of Delaware No Drawing. Application November 18, 1938, Serial No. 241,197. In Germany December 1, 1937

14 Claims. (Cl. 260—354)

The present invention relates to vat dyestuffs of the dibenzanthrone series and a process of producing same.

I have found that new and valuable vat dyestuffs of the dibenzanthrone series can be obtained by heating the compounds obtainable by reacting dihydroxydibenzanthrones in the presence of a catalyst selected from the class consisting of metallic iron and anhydrous ferric halides with aromatic acid halides in the manner described in British Patent 480,284, with compounds corresponding to the formula R—NH$_2$, wherein R stands for a member of the group consisting of —H, —NH$_2$, —NH-aryl, alkyl, cycloalkyl and of acyl radicals selected from the class consisting of carboxylic and sulphonic acids.

Compounds R—NH$_2$ suitable for this process are for example ammonia, hydrazine, phenyl hydrazine, nitrophenyl hydrazine, chlorphenyl hydrazine, naphthyl hydrazine, methylamine, ethylamine, propylamines, butylamines, amylamines, dodecylamines, hydroxyalkylamines, benzylamine, phenylethylamine, cyclohexylamine, 1,2,3,4-tetrahydro-2-aminonaphthalene, formamide, acetamide, benzamides, toluene sulfamides.

Especially valuable dyestuffs are obtained from the compounds obtainable by the reaction of dihydroxydibenzanthrones with aromatic acid chlorides which contain halogen in ortho-position to the carboxyl group. The reaction is preferably carried out in a diluent of high boiling point, as for example in nitro- or chlorhydrocarbons (nitrobenzene or trichlorbenzene) or phenols.

The new dyestuffs are usually very difficultly soluble in organic solvents giving a red coloration and a yellow fluorescence. They are distinguished by great stability and are not decomposed either by hot sulphuric acid or in the hot vat. The dyeings prepared therewith have excellent fastness to chlorine and kier boiling. If desired the dyestuffs may be purified for example by recrystallization from nitrobenzene or trichlorbenzene or by precipitation in stages from their solutions in sulphuric acid.

The following examples will further illustrate how the said invention may be carried out in practice, but the invention is not restricted to these examples. The parts are by weight.

Example 1

A mixture of 25 parts of the compound derived from dihydroxydibenzanthrone and benzoyl chloride described in Example 1 of the British Patent No. 480,284 and 350 parts of nitrobenzene is heated to from 190° to 200° C., while leading in ammonia. The heating and the leading in of ammonia are continued for 3 hours, the mixture is allowed to cool, the dyestuff is filtered off by suction and washed with nitrobenzene and benzene. The dyestuff may be purified by recrystallization from nitrobenzene or trichlorbenzene and by precipitation in stages by means of water from its solution in strong sulphuric acid. It dissolves in strong sulphuric acid giving a blue coloration and dyes cotton Bordeaux red shades from a blue vat.

Example 2

25 parts of the compound derived from dihydroxydibenzanthrone and 2,4-dichlorbenzoyl chloride described in Example 2 of the British Patent 480,284 in 300 parts of nitrobenzene are treated with ammonia for 2 hours at from 190° to 200° C. as described in Example 1. The dyestuff, separated in the same way, dissolves in strong sulphuric acid giving a blue coloration and dyes cotton powerful, pure red shades of great fastness from a hot blue vat.

If the 2,4-dichlorbenzoyl chloride used in the preparation of the initial material be replaced by 2-monochlorbenzoyl chloride and the above procedure be followed, a dyestuff having the same tinctorial properties is obtained.

Example 3

7 parts of the compound derived from dihydroxydibenzanthrone and 1-chloranthraquinone-2-carboxylic acid chloride as described in Example 3 of the British Patent 480,284 in 100 parts of nitrobenzene are treated with ammonia in the manner described in Example 1. The dyestuff may be purified as hereinbefore described; it dissolves in strong sulphuric acid giving a blue coloration and dyes cotton red shades from a blue vat.

Example 4

50 parts of the initial material described in Example 2 are heated to boiling with 500 parts of phenol and 50 parts of phenyl hydrazine while stirring. The originally green-blue colored solution soon becomes red. The dyestuff separates in crystalline form; it is filtered off by suction at about 50° C. and washed with warm phenol and alcohol. It agrees in its properties with the dyestuff of Example 2.

Example 5

5 parts of the initial material of Example 4 are heated to boiling with 50 parts of phenol and 5 parts of benzylamine for an hour. The separated dyestuff has similar properties to that described in Example 4.

Example 6

3 parts of the initial material used in Example 5, 5 parts of methylamine hydrochloride, 5 parts of sodium acetate and 50 parts of trichlorbenzene are heated to from 190° to 200° C. for 5 hours in a sealed tube. The separated red dyestuff is filtered off by suction, washed with trichlorbenzene and benzene and freed from organic salts by boiling up with water.

It dyes cotton in the same shades as the dyestuff of Example 5.

Example 7

A mixture of 3 parts of the initial material described in Example 1, 1.5 parts of toluene sulphamide and 30 parts of nitrobenzene are boiled for 5 hours while stirring. The whole is allowed to cool and the dyestuff formed filtered off by suction. It dissolves in strong sulphuric acid giving a blue coloration and dyes cotton powerful Bordeaux red shades from a blue vat.

Example 8

A mixture of 3 parts of the initial material described in Example 2, 1.5 parts of para-toluene sulphamide and 30 parts of nitrobenzene is boiled until the green-blue color of the initial material has become red. The red vat dyestuff thus obtained is separated as described in Example 7. It agrees in its properties with the product described in the first paragraph of Example 2.

Example 9

3 parts of the initial material used in Example 2 are heated with 5 parts of benzamide and 30 parts of nitrobenzene in the manner described in Example 8. The dyestuff obtained agrees with that of the foregoing example.

The same dyestuff is also obtained by using acetamide instead of benzamide.

Example 10

3 parts of the initial material used in Example 2 are boiled with 5 parts of para-toluene sulphomethylamide in 30 parts of nitrobenzene for about 5 hours. The dyestuff which separates on cooling is filtered off by suction. It dissolves in strong sulphuric acid giving a blue coloration and is precipitated from this solution in red flocks upon dilution with water. It dyes cotton powerful Bordeaux red shades from a blue vat.

Example 11

A mixture of 5 parts of the initial material described in Example 2, 50 parts of phenol and 20 parts of hydrazine hydrate is boiled until the mixture has become red. After cooling at about 50° C. the deposited dyestuff is filtered off by suction, washed with methanol and dried. The red dyestuff thus obtained dissolves in concentrated sulphuric acid giving a blue coloration and it dyes cotton red shades from a blue vat.

Example 12

A mixture of 5 parts of the initial material described in Example 2, 50 parts of cyclohexylamine is heated in a closed vessel at from 190° to 200° C. for 5 hours. After working up in the usual manner a dyestuff is obtained which dissolves in concentrated sulphuric acid giving a blue coloration and which dyes cotton red shades from a blue vat.

Example 13

A mixture of 5 parts of the initial material described in Example 2, 10 parts of formamide and 60 parts of nitrobenzene is boiled for about 1 hour. After cooling the deposited dyestuff is worked up in the usual manner. It dissolves in concentrated sulphuric acid giving a blue coloration and dyes cotton red shades from a blue vat.

What I claim is:

1. A process of producing vat dyestuffs of the dibenzanthrone series which comprises heating compounds, obtainable by reacting dihydroxydibenzanthrones in the presence of a catalyst selected from the class consisting of metallic iron and anhydrous ferric halides with aromatic acid halides, with compounds corresponding to the formula $R-NH_2$, wherein R stands for a member of the group consisting of $-H$, $-NH_2$, $-NH$-aryl, alkyl, aralkyl, cycloalkyl and of acyl radicals selected from the class consisting of carboxylic and sulfonic acids.

2. A process of producing vat dyestuffs of the dibenzanthrone series which comprises heating compounds, obtainable by reacting dihydroxydibenzanthrones in the presence of a catalyst selected from the class consisting of metallic iron and anhydrous ferric halides with aromatic acid halides, with compounds corresponding to the formula $R-NH_2$, wherein R stands for a member of the group consisting of $-H$, $-NH_2$, $-NH$-aryl, alkyl, aralkyl, cycloalkyl and of acyl radicals selected from the class consisting of carboxylic and sulfonic acids in the presence of an inert diluent.

3. A process of producing vat dyestuffs of the dibenzanthrone series which comprises heating compounds, obtainable by reacting dihydroxydibenzanthrones in the presence of a catalyst selected from the class consisting of metallic iron and anhydrous ferric halides with aromatic acid halides, with compounds corresponding to the formula $R-NH_2$, wherein R stands for a member of the group consisting of $-H$, $-NH_2$, $-NH$-aryl, alkyl, aralkyl, cycloalkyl and of acyl radicals selected from the class consisting of carboxylic and sulfonic acids in the presence of nitrobenzene.

4. A process of producing vat dyestuffs of the dibenzanthrone series which comprises heating compounds, obtainable by reacting $Bz2.Bz2'$-dihydroxydibenzanthrones in the presence of a catalyst selected from the class consisting of metallic iron and anhydrous ferric halides with aromatic acid halides, with compounds corresponding to the formula $R-NH_2$, wherein R stands for a member of the group consisting of $-H$, $-NH_2$, $-NH$-aryl, alkyl, aralkyl, cycloalkyl and of acyl radicals selected from the class consisting of carboxylic and sulfonic acids.

5. A process of producing vat dyestuffs of the dibenzanthrone series which comprises heating compounds, obtainable by reacting $Bz2.Bz2'$-dihydroxydibenzanthrones in the presence of a catalyst selected from the class consisting of metallic iron and anhydrous ferric halides with aromatic acid halides having a halogen atom in the ortho-position to the acid halide group, with compounds corresponding to the formula $R-NH_2$, wherein R stands for a member of the group consisting of $-H$, $-NH_2$, $-NH$-aryl, alkyl, aralkyl, cycloalkyl and of acyl radicals selected from the class consisting of carboxylic and sulfonic acids.

6. A process of producing vat dyestuffs of the dibenzanthrone series which comprises heating compounds, obtainable by reacting Bz2.Bz2'-dihydroxydibenzanthrones in the presence of a catalyst selected from the class consisting of metallic iron and anhydrous ferric halides with a dichlorbenzoylchloride having one chlorine atom in the ortho-position to the acid chloride group, with compounds corresponding to the formula R—NH$_2$, wherein R stands for a member of the group consisting of —H, —NH$_2$, —NH-aryl, alkyl, aralkyl, cycloalkyl and of acyl radicals selected from the class consisting of carboxylic and sulfonic acids.

7. A process of producing vat dyestuffs of the dibenzanthrone series which comprises heating compounds, obtainable by reacting Bz2.Bz2'-dihydroxydibenzanthrones in the presence of a catalyst selected from the class consisting of metallic iron and anhydrous ferric halides with 2,4-dichlorbenzoylchloride, with compounds corresponding to the formula R—NH$_2$, wherein R stands for a member of the group consisting of —H, —NH$_2$, —NH-aryl, alkyl, aralkyl, cycloalkyl and of acyl radicals selected from the class consisting of carboxylic and sulfonic acids.

8. A vat dyestuff of the dibenzanthrone series dyeing vegetable fibers red shades from a blue vat obtained by heating compounds, obtainable by reacting Bz2.Bz2'-dihydroxydibenzanthrone in the presence of a catalyst selected from the class consisting of metallic iron and anhydrous ferric halides with aromatic acid halides, with compounds corresponding to the formula R—NH$_2$, wherein R stands for a member of the group consisting of —H, —NH$_2$, —NH-aryl, alkyl, aralkyl, cycloalkyl and of acyl radicals selected from the class consisting of carboxylic and sulfonic acids.

9. A vat dyestuff of the dibenzanthrone series dyeing vegetable fibers red shades from a blue vat obtained by heating compounds, obtainable by reacting Bz2.Bz2'-dihydroxydibenzanthrone in the presence of a catalyst selected from the class consisting of metallic iron and anhydrous ferric halides with aromatic acid halides having a halogen atom in the ortho-position to the acid halide group, with compounds corresponding to the formula R—NH$_2$, wherein R stands for a member of the group consisting of —H, —NH$_2$, —NH-aryl, alkyl, aralkyl, cycloalkyl and of acyl radicals selected from the class consisting of carboxylic and sulfonic acids.

10. A vat dyestuff of the dibenzanthrone series dyeing vegetable fibers red shades from a blue vat obtained by heating compounds, obtainable by reacting Bz2.Bz2'-dihydroxydibenzanthrone in the presence of a catalyst selected from the class consisting of metallic iron and anhydrous ferric halides with a dichlorbenzoylchloride having one chlorine atom in the ortho-position to the acid chloride group, with compounds corresponding to the formula R—NH$_2$, wherein R stands for a member of the group consisting of —H, —NH$_2$, —NH-aryl, alkyl, aralkyl, cycloalkyl and of acyl radicals selected from the class consisting of carboxylic and sulfonic acids.

11. A vat dyestuff of the dibenzanthrone series dyeing vegetable fibers red shades from a blue vat obtained by heating compounds, obtainable by reacting Bz2.Bz2'-dihydroxydibenzanthrone in the presence of a catalyst selected from the class consisting of metallic iron and anhydrous ferric halides with 2,4-dichlorbenzoylchloride, with compounds corresponding to the formula R—NH$_2$, wherein R stands for a member of the group consisting of —H, —NH$_2$, —NH-aryl, alkyl, aralkyl, cycloalkyl and of acyl radicals selected from the class consisting of carboxylic and sulfonic acids.

12. A vat dyestuff of the dibenzanthrone series dyeing vegetable fibers red shades from a blue vat obtained by heating compounds, obtainable by reacting Bz2.Bz2'-dihydroxydibenzanthrone in the presence of a catalyst selected from the class consisting of metallic iron and anhydrous ferric halides with aromatic acid halides, with ammonia in the presence of an inert diluent.

13. A vat dyestuff of the dibenzanthrone series dyeing vegetable fibers red shades from a blue vat obtained by heating compounds, obtainable by reacting Bz2.Bz2'-dihydroxydibenzanthrone in the presence of a catalyst selected from the class consisting of metallic iron and anhydrous ferric halides with aromatic acid halides, with phenylhydrazine.

14. A vat dyestuff of the dibenzanthrone series dyeing vegetable fibers red shades from a blue vat obtained by heating compounds, obtainable by reacting Bz2.Bz2'-dihydroxydibenzanthrone in the presence of a catalyst selected from the class consisting of metallic iron and anhydrous ferric halides with aromatic acid halides, with formamide.

WALTER BRUCK.